A. B. WOODARD.

Vulcanizing Flask.

No. 2,938. Reissued May 19 1868.

Witnesses

Wm. E. Lynn

Theo Lusch

Inventor

A. B. Woodard

Munn & Co

Attorneys

N. PETERS, Photo-Lithographer, Washington, D. C.

United States Patent Office.

A. B. WOODARD, OF ALFRED CENTRE, NEW YORK, ASSIGNOR TO HIMSELF AND THOMAS ELLIS, OF SAME PLACE.

*Letters Patent No.* 52,107, *dated January* 16, 1866; *reissue No.* 2,938, *dated May* 19, 1868.

IMPROVED VULCANIZING-FLASK.

The Schedule referred to in these Letters Patent and making part of the same.

TO ALL WHOM IT MAY CONCERN:

Be it known that I, A. B. WOODARD, of Alfred Centre, in the county of Allegany, and State of New York, have invented a new and improved Vulcanizing-Flask; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to improve the construction of that class of vulcanizing-flasks which are generally used for dental purposes, so as to make them more convenient and effective in use; and it consists in compressing the flask to mould the rubber gradually and automatically within the vulcanizing-vessel, and while the rubber is becoming softened or melted, by means of steam pressure, and in the construction and combination of the parts of the apparatus by which this is effected.

Figure 1:
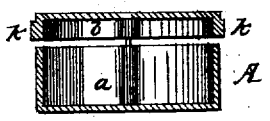
Figure 1 is a vertical central section of the flask detached.
Figure 2:
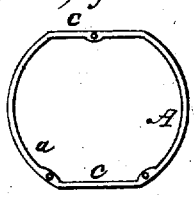
Figure 2 is a plan or top view of the same.

A is the flask, in which the rubber is moulded, and which is made in two parts, *a* and *b*, which said parts are kept in their proper relative position, while being pressed together, by guide-pins, as shown in fig. 1. The opposite sides of the flask A are flattened, as shown at the points *c* in fig. 2, to adapt it to the receiver, in which it is compressed.

Figure 3:
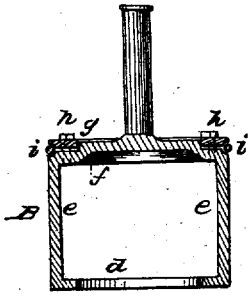
Figure 3 is a vertical central section of the piston and flask-receiver.
Figure 4:
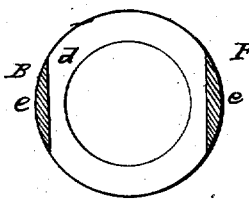
Figure 4 is a horizontal section of the flask-receiver.
Figure 5:
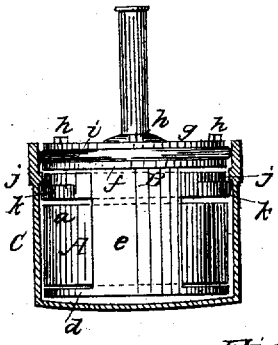
Figure 5 is a vertical central section of the boiler, showing the piston, flask-receiver, and flask in place.

B is the flask-receiver, the bottom, *d*, of which is made annular, as shown in figs. 3 and 4. To the sides of the annular bottom *d* are attached the lower ends of the connections or standards *e*, the inner sides of which are made flat to fit upon the flattened sides, *c*, of the flask A, and the outer sides of which are made curved to correspond with the curve of the flask A, so that when the said flask A is inserted in the receiver B, the two may form a cylindrical body, as shown in fig. 5. The upper ends of the standards *e* of the receiver B are securely attached to or formed solid with the piston *f'*. *g* is a loose annular plate, which is secured to the piston *f'* in such a way as to hold the ring-packing, *i*, between it and the piston *f'*, so that by tightening up the screw-nuts *h*, by which the said ring-plate is secured to the said piston, the said packing may be forced out and made to bear, steam-tight, against the sides of the boiler or vulcanizing-vessel, C, in which the said piston has been placed.

Figure 6:
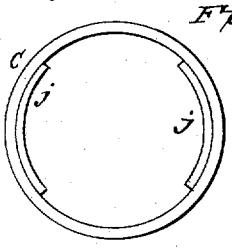
Figure 6 is a plan or top view of the boiler.

C is a cylindrical boiler, the interior diameter of which should be a little greater than the exterior diameter of the cylindrical body formed by the piston *f'*, receiver B, and flask A, so as to leave a narrow but free space all around the flask for the free passage of the steam. Upon the opposite sides of the interior surface of the boiler C are formed flanges, *j*, extending a little less than one-quarter around said boiler, as shown in fig. 6; and upon the opposite sides of the cover or upper part, *b*, of the flask A are formed flanges or lugs, *k*, which extend a little less than one-quarter around the said flask.

In using the flask, the plaster mould is adjusted in the part *a* of the flask A, and the required amount of rubber placed in it. The cover or upper part, *b*, of said flask is then adjusted in place, and the flask compressed by hand, so that it can be introduced into the receiver B. The flask A, receiver B, and piston *f* are then introduced into the boiler C, into which a small quantity of water has been poured, in such a way that the segmental flanges, *k*, of the flask A may pass down between the ends of the flanges *j* of the boiler C. The piston *f'*, receiver B, and flask A are then turned one-quarter around, so that the flanges *k* of the flask A may be directly beneath the flanges *j* of the boiler C, as shown in fig. 5, so that it may be impossible to draw or force the said flask from the said boiler by any power when applied in a vertical direction. The nuts *h* are then turned down so as to force out the packing-ring *i* against the interior surface of the boiler or vulcanizing-vessel to make the connection between the piston *f'* and the said boiler C steam-tight.

The boiler C and its contents are then placed over a suitable heater, so that the heat may be communicated through the bottom of the said boiler. The water, flask, plaster, and rubber are gradually heated to the boiling-point, at which point sufficient steam has been generated to overcome the friction of the piston against the boiler, and as the heat increases, the piston moves up gradually in the boiler, gradually and automatically closing or pressing the flask. The rubber at the same time gradually softens until the temperature has reached 248° Fahrenheit, at which point it melts, and at which point the flask is fully closed, and the limit of compression is reached. The heat and pressure are continued until a temperature of 320° Fahrenheit is reached, at which point the rubber is vulcanized.

The method of closing the flask and moulding the rubber, heretofore practised, has been to close the flask outside of the vulcanizer by immersing the said flask in an open vessel of water, and heating it to the boiling-point. The flask was then closed and the rubber moulded by forcing the flask together by means of screw-bolts, the rubber never being heated above the boiling-point.

It will thus be seen that my improvement furnishes a great advantage over the old way, since the rubber is moulded and the flasks closed while the rubber is in its most plastic state, and is thus much easier moulded, and is much less liable to break the plaster mould or teeth.

I am aware that a machine has been constructed to inject the rubber into the mould, when the flask is closed, by means of a piston connected with the boiler or vulcanizer. This I do not claim; but

What I claim as my invention, and desire to secure by Letters Patent, is—

1. Closing the flask A, within the vulcanizing-vessel, by the pressure of steam, substantially as herein shown and described, so that while the rubber is gradually heated, the flask is gradually and automatically closed, and the rubber moulded when in its most plastic state.

2. Applying steam-pressure to close the flask A, within the vulcanizing-vessel, by means of a piston.

3. Forming segmental flanges, *j*, upon the interior of the vulcanizing-vessel or boiler C, and corresponding segmental flanges, *k*, upon the exterior of the upper part or cover *b* of the flask A, substantially as herein shown and described, for the purpose of locking the said flask in and to the said vessel.

4. The segmental connections *e*, of the receiver B, in combination with the flattened sides of the flask A, and with the piston *f*, substantially as herein shown and described, and for the purpose set forth.

5. The combination of the annular plate *g* and ring-packing *i* with the piston *f* and boiler or vulcanizing-vessel C, substantially as herein shown and described, and for the purpose set forth.

The above specification of my invention signed by me, this 6th day of February, 1868.

A. B. WOODARD.

Witnesses:

WM. F. MCNAMARA,

JAMES T. GRAHAM.